United States Patent
Allen et al.

(10) Patent No.: US 10,817,666 B2
(45) Date of Patent: *Oct. 27, 2020

(54) SYSTEM AND METHOD FOR INTEGRATED DEVELOPMENT ENVIRONMENTS FOR DYNAMICALLY GENERATING NARRATIVE CONTENT

(71) Applicant: STATS LLC, Chicago, IL (US)

(72) Inventors: Robert Allen, Durham, NC (US); Joe Procopio, Durham, NC (US); Robert C Rogers, Durham, NC (US)

(73) Assignee: STATS LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/376,608

(22) Filed: Dec. 12, 2016

(65) Prior Publication Data

US 2017/0220555 A1 Aug. 3, 2017

Related U.S. Application Data

(63) Continuation of application No. 14/483,986, filed on Sep. 11, 2014, now Pat. No. 9,519,635.

(51) Int. Cl.
| | |
|---|---|
| *G06F 40/205* | (2020.01) |
| *G06F 40/289* | (2020.01) |
| *G06Q 10/00* | (2012.01) |
| *G06Q 40/00* | (2012.01) |
| *G06F 40/106* | (2020.01) |
| *G06F 40/166* | (2020.01) |
| *G06F 40/253* | (2020.01) |

(52) U.S. Cl.
CPC .......... *G06F 40/289* (2020.01); *G06F 40/106* (2020.01); *G06F 40/166* (2020.01); *G06F 40/253* (2020.01); *G06Q 10/00* (2013.01); *G06Q 40/00* (2013.01)

(58) Field of Classification Search
CPC .......... G06F 17/27; G06F 17/20; G06F 17/21; G06F 17/2705; G06F 17/271; G06F 17/2715; G06F 17/2775; G06F 17/2785; G06F 40/20; G06F 40/205; G06F 40/221; G06F 40/216; G06F 40/226; G06F 40/253; G06F 40/30
USPC .................................. 704/9, 1, 4, 7, 10, 257
See application file for complete search history.

(56) References Cited

U.S. PATENT DOCUMENTS

| | | | |
|---|---|---|---|
| 7,509,313 B2 * | 3/2009 | Colledge | G06F 17/2785 |
| 8,477,994 B1 * | 7/2013 | Noshadi | H04N 1/00167 382/103 |

(Continued)

*Primary Examiner* — Qi Han
(74) *Attorney, Agent, or Firm* — DLA Piper LLP (US)

(57) ABSTRACT

The present invention is a method and apparatus for narrative content generation using narrative frameworks by receiving a first phrase variation and a second phrase variation and displaying an error indication when the first phrase variation fails to satisfy a criterion relative to the second phrase variation. If there is an error indication, alternate phrase variations are received and compared against the first phrase variation until an alternate phrase variation is selected that has no error indication. Additionally, multiple sets of operators for updating one or more narrative phrases selected for inclusion in the narrative content framework may be utilized to update selected phrases after inclusion in the narrative framework but prior to finalizing the narrative content to be output.

20 Claims, 12 Drawing Sheets

(56) References Cited

U.S. PATENT DOCUMENTS

2013/0041677 A1\* 2/2013 Nusimow .............. G06Q 50/22
705/2
2014/0052444 A1\* 2/2014 Roberge ................. G10L 15/08
704/243

\* cited by examiner

FIG. 11

SYSTEM AND METHOD FOR INTEGRATED DEVELOPMENT ENVIRONMENTS FOR DYNAMICALLY GENERATING NARRATIVE CONTENT

CROSS-REFERENCE TO RELATED APPLICATIONS

This application is a continuation of U.S. patent application Ser. No. 14/483,986, filed Sep. 11, 2014 and issued as U.S. Pat. No. 9,519,635 on Dec. 13, 2016, entitled "SYSTEM AND METHOD FOR INTEGRATED DEVELOPMENT ENVIRONMENTS FOR DYNAMICALLY GENERATING NARRATIVE CONTENT."

COPYRIGHT AND TRADEMARK NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever. Trademarks are the property of their respective owners.

BACKGROUND

As content providers have moved to broaden and deepen their own news and other media offerings, they have accordingly sought ways to improve efficiency and minimize the cost of content generation. Content generation produced in a narrative language context is particularly difficult and costly to provide, but highly desired by clients of systems that produce news and other text media offerings. Among the greatest expenses in the generation of narrative text offerings are the salary and operating costs associated with maintaining a journalistic staff of reporters and editors. The systems and methods described herein relate generally to programmatically generated narrative content.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which:

FIG. 11 is a screenshot of a GUI that illustrates exemplary sample data.

DETAILED DESCRIPTION

Figure 1:
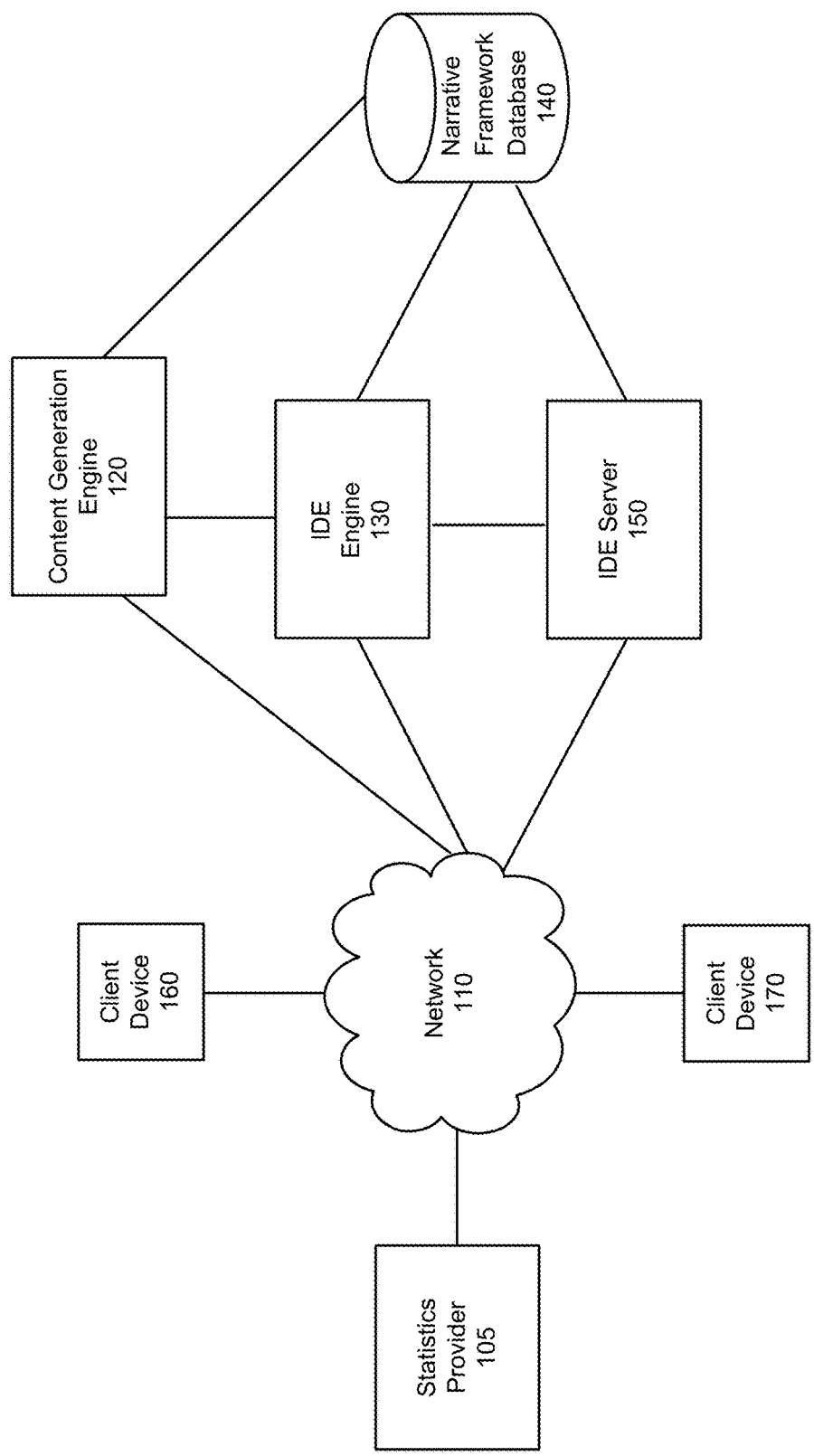
FIG. 1 is a schematic block diagram that illustrates a narrative framework generation system, according to an embodiment.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one, or more than one. The term "plurality", as used herein, is defined as two, or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Reference throughout this document to "one embodiment", "certain embodiments", "an exemplary embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

Reference throughout this document to a network can be any computer or information network capable of marshalling, transmitting, routing, directing and/or forwarding data between two or more hardware devices and/or software modules. For example, a network can be a local area network (LAN), a wide area network (WAN) or the Internet. A network can include one or more wired and/or wirelessly connected hardware devices.

References throughout this document to code can be, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other object-oriented programming languages and development tools. Additional examples of computer code include, but are not limited to, control data, encrypted code, and compressed code.

Reference throughout this document to a statistics provider can be any service that provides statistics (e.g., sports statistics, financial market statistics, statistics related to performance of an organization), news information (e.g., newswires, weather forecasts and data), and/or other information associated with a past, current, or future real-world event, person, place and/or thing. The statistics provider can further provide statistics, news information and/or other information associated with one or more virtual events (e.g., information, data and/or statistics associated with a video game, a fantasy sports league and/or team, etc.) In a non-limiting example, the statistics provider can be a sports statistics service that provides substantially real-time data associated with completed, in-progress and/or scheduled sporting events (e.g., completed game statistics, in-game statistics), one or more athletes, teams and/or leagues (e.g., player statistics, team statistics, injury reports, season statistics), etc. In an alternative non-limiting example, the statistics provider can be a weather information service that provides weather reports, forecasts, current conditions (e.g., temperature, barometric pressure), map information (e.g., satellite maps, radar maps), etc. Additionally, the statistics provider can be an organization that generates commentary and financial reports (e.g., based on the organization's performance quarterly, annually, etc.). Such reports can be provided to employees of the organization and/or parties affiliated with the organization.

Reference throughout this document to a network card can be a hardware module or device (wired and/or wireless Ethernet card, a cellular network interface card) configured to transmit information such as data packets, data cells, and other data communications in network acceptable formatting from and receive such information to the network card.

Reference throughout this document to a processor can be any processor (e.g., a central processing unit (CPU), an application-specific integrated circuit (ASIC), a field programmable gate array (FPGA)) configured to execute one or more instructions received from, for example, a memory device or construct. In an exemplary embodiment, the processor can be a Reduced Instruction Set (RISC) processor. In an exemplary embodiment, the processor may send information (e.g., data, instructions and/or network data packets) to and/or receive information from any memory device or network card in data communication with the processor.

Reference throughout this document to a memory can be any memory device or implementation, for example RAM, ROM, a hard disk drive, and optical drive, or other removable media configured to store information.

Reference throughout this document to a relational database, including one or more relational database tables, can be any relational database such as, for example, the relational database engine provided by Oracle, Microsoft SQL Server, MySQL, PostgreSQL, Informix and/or other databases that create and maintain databases using relational structures and database management software.

Reference to "tone" in this document refers to the mood of the generated narrative content created through the use of figurative language, point of view and word choice. In a non-limiting example, a positive performance tone for generated narrative content can be associated with a positive, sanguine, energetic, hopeful, or other similar mood to the generated narrative content.

Reference to "theme" in this document refers to content associated with and/or based at least in part on a given theme, such as a series of events, an ongoing topic of interest, a predefined author style, such as a writing or composition style of a given author, journalist or other individual. In a non-limiting embodiment, a narrative framework can include phrases and/or phrase variations constructed in a similar style, fashion and/or manner to those of the author, journalist or other individual.

Reference throughout this document to a "narrative framework" refers to a data construct or module implemented in software and maintained in a hardware storage device and can include phrases and/or other kinds of information and structural and/or data connections between the phrases and other information contained within the narrative framework. In an exemplary embodiment, narrative frameworks defined by an IDE system (or, equivalently an IDE engine) can be used by content generation systems to create narrative content in natural human language. In an additional exemplary embodiment, narrative frameworks defined by an IDE system can include input from users, e.g., in the form of various criteria, thresholds, templates, text, phrases, and freeform data. In additional exemplary embodiments, an IDE system allows users to review and/or interact with the narrative framework as it is being defined in real time, e.g., for purposes of editing and making changes to the narrative framework.

Reference throughout this document to a Graphical User Interface ("GUI") may include displays having message areas, interactive fields, pop-up windows, pull-down lists, notification areas, menus, tabs, and/or buttons that can be operated by the user. The GUI may include multiple levels of abstraction including groupings and boundaries. It should be noted that the term "GUI" may be used in the singular or in the plural to describe one or more GUI's, and each of the displays of a particular GUI may provide the user of a client device with a user-friendly interactive environment and information associated with the IDE Engine.

One object of the present invention is to provide systems and methods that enable a content provider to define narrative frameworks (or, equivalently narrative content frameworks) that can be used to generate narrative content without the use of a human writer and editor. More specifically, a need exists for systems and methods to define a wide variety of narrative frameworks that can be used to then generate narratives or narrative content based on one or more events, occurrences, facts, persons, places, organizations and/or things, such as sporting events, teams and/or players, financial institutions and/or markets, weather conditions, general news items, and/or the like. In an exemplary embodiment an IDE system can perform various checks to determine that the narrative framework is free from logical errors, computational errors, statistical errors, syntax errors, run-time errors and other pre-defined error conditions in an automatic editing operation. In a non-limiting example, for error detection, and IDE system performs a comparison check to determine whether two or more phrases included in a generated narrative framework are grammatically consistent with one another. In another non-limiting example, an IDE system can detect logical errors between phrases or variables included in a generated narrative framework. In an embodiment, the IDE system provides real time indication to users of the IDE system for any errors detected in narrative frameworks, as those narrative frameworks are defined and generated.

FIG. 1 is a schematic block diagram that illustrates a narrative framework generation system, according to an embodiment. In an exemplary embodiment, this figure illustrates a narrative framework generation system 100 that includes an IDE engine 130 for generating narrative frameworks. The IDE engine 130 is coupled to a content generation engine 120, an IDE server 150, and a narrative framework database 140. The IDE engine 130 is further coupled to a statistics provider 105, and client devices 160, 170 via a network 110.

Although not shown in FIG. 1, in some embodiments the statistics provider 105 can itself receive one or more information reports (e.g., statistic reports) from one or more other sources (not shown in FIG. 1). In such embodiments, the statistics provider 105 can aggregate received information for subsequent transmission to the IDE engine 130, the content generation engine 120, the IDE server 150, and/or the narrative framework database 140 via the network 110.

In such embodiments, the statistics provider 105 can send the information from a single physical location. Alternatively, the statistics provider 105 can send data from multiple physical locations, each physical location being associated and/or affiliated with the statistics provider 105. The statistics provider 105 can be owned, operated and/or administered by a third-party entity not related and/or affiliated with the other elements of the narrative content generation system.

The IDE engine 130 can be any combination of hardware and/or software (executing in hardware) configured to define narrative content frameworks (also referred to herein as narrative frameworks) based at least in part on information received from the statistics provider 105, pre-stored information, and user-provided information. As discussed herein, a narrative framework generated by the IDE engine 130 can be used to define a narrative content portion (e.g., an article, report, summary, preview, bullet point, short-form text, etc.). The IDE engine 130 can be, for example, a server device executing one or more software modules configured to combine information (e.g., one or more phrase variations in addition to text and associated criteria for defining narrative frameworks), user-provided information/text, and statistics received from the statistics provider 105 to define a narrative framework that is applicable to characterize an event. Such an event could have already occurred in the past, is currently occurring, or can be occurring in the future.

In some embodiments, the IDE engine 130 generates a preview narrative framework (in other words, a preview of the narrative framework being defined) that has a substantively similar "look and feel" as the narrative content portion. Such a preview narrative framework (typically includes sample data from the statistics provider 105) allows a user to review how a hypothetical narrative content portion will look when the defined narrative framework is used to characterize an event. In this exemplary embodiment, a user of system 100 can preview what the narrative content portion for a future event may include. The sample data included in the preview narrative framework can relate to a statistic of the event, e.g., a sample statistic. In some embodiments, a user can review a narrative framework in real time as it is being generated by the IDE engine 130. The narrative framework generated by the IDE engine can be sent to an IDE server 150 for presenting on a client device 160. In an exemplary embodiment, a user can, in addition to reviewing a narrative framework, interact with the narrative framework as it is being defined, e.g., for purposes of guiding the editing and directing changes to the narrative framework. As referred to herein, a preview narrative framework is formed by inserting/including sample data into a narrative framework. Such insertion/inclusion can occur while a narrative framework is being defined, or alternatively, after a narrative framework is completely defined. Also, an exemplary embodiment of the present disclosure, more than one set or type of sample data can be included as a part of a preview narrative framework.

In addition to the narrative framework, the content generation engine 120 can also receive, from the IDE engine 130, one or more phrases and/or phrase variations associated with the selected narrative framework. In an exemplary embodiment, the phrases and/or phrase variations can be associated with text elements, for example, words, phrases, sentences, paragraphs, etc. or, a combination thereof. As described herein, text elements can be associated with an author style or a narrative tone of the given event, occurrence, fact, person, place, organization and/or thing.

The narrative framework database 140 can be a database and/or a database server storing one or more databases including one or more narrative content narrative frameworks, identifiers of one or more persons, places, things, facts, events, occurrences, sports leagues, teams and/or athletes, locations, forecasts, organizations, etc., and/or statistics and/or other information associated with the same. Additionally, the narrative framework database 140 can store phrases, phrase variations, text elements, tone types, themes and/or theme types, and/or other information associated with one or more narrative frameworks. The narrative framework database 140 is coupled to the IDE engine 130 and therefore, exchanges information with the IDE engine 130 such that both the IDE engine 130 and the narrative framework database 140 can stay up-to-date and remain synchronized with respect to their stored/generated information.

The narrative framework database 140 can, in some embodiments, store or be coupled to one or more database servers that store previously-generated narrative content portions defined by the content generation engine 120. Such database servers can include one or more relational databases including one or more relational database tables, similar in structure, type, format, hierarchy and/or organization to those included in the narrative framework database 140. The narrative framework database 140 can be included in and/or stored at the same physical device as the IDE engine 130. Alternatively, one or more portions of the narrative framework database 140 (e.g., entire databases and/or relational database tables) can be stored across multiple devices, such as database server devices.

The IDE server 150 is operatively coupled, via the network 110, to the client device 160 and to the client device 170. Thus, the IDE server 150 can be configured to send narrative frameworks to either or both of the client device 160 and the client device 170. Although not shown in FIG. 1, in some embodiments, the IDE server 150 can serve narrative frameworks to any number of client devices connected via the network 110. In some embodiments, the IDE server 150 can serve narrative frameworks via one or more web servers and/or application servers executing thereat. For example, the IDE server 150 can host and/or execute a version of the Apache or Microsoft Internet Information Server (IIS) web servers to facilitate access to the narrative framework by client devices.

In an exemplary embodiment, the IDE server 150 can be a physical device operatively coupled to the narrative framework database 140. Alternatively, the IDE server 150 can be a software module executing at a computing device, such as a server device at which any of the content generation engine 120, the IDE engine 130 and/or the narrative framework database 140 is hosted.

Each of the client device 160 and the client device 170 can be any computing device (e.g., a personal computer, laptop, notebook, netbook, tablet, smartphone, mobile computing device) configured to receive and/or display narrative frameworks as well as narrative content received from the IDE server 150 via the network 110. In a non-limiting example, the client device 160 can be a personal desktop computer executing a web browser or other client application capable of receiving (e.g., from a web server) and displaying dynamically-defined narrative frameworks and/or narrative content similar to that described above. In a non-limiting embodiment, the client device 170 can be a mobile telephone (e.g., a web-enabled smartphone) capable of communicating, via the Internet, with one or more web servers and/or databases. In such an embodiment, the client device 170 can receive one or more narrative frameworks, narrative content portions, articles, reports, etc. and/or display the same for viewing by a user. Although only two client devices are shown in FIG. 1, this should not be considered limiting as in some embodiments any number of compatible client devices can be operatively and/or physically coupled to the network 110, and thus capable of receiving and/or displaying narrative frameworks received from the IDE server 150.

Figure 2:
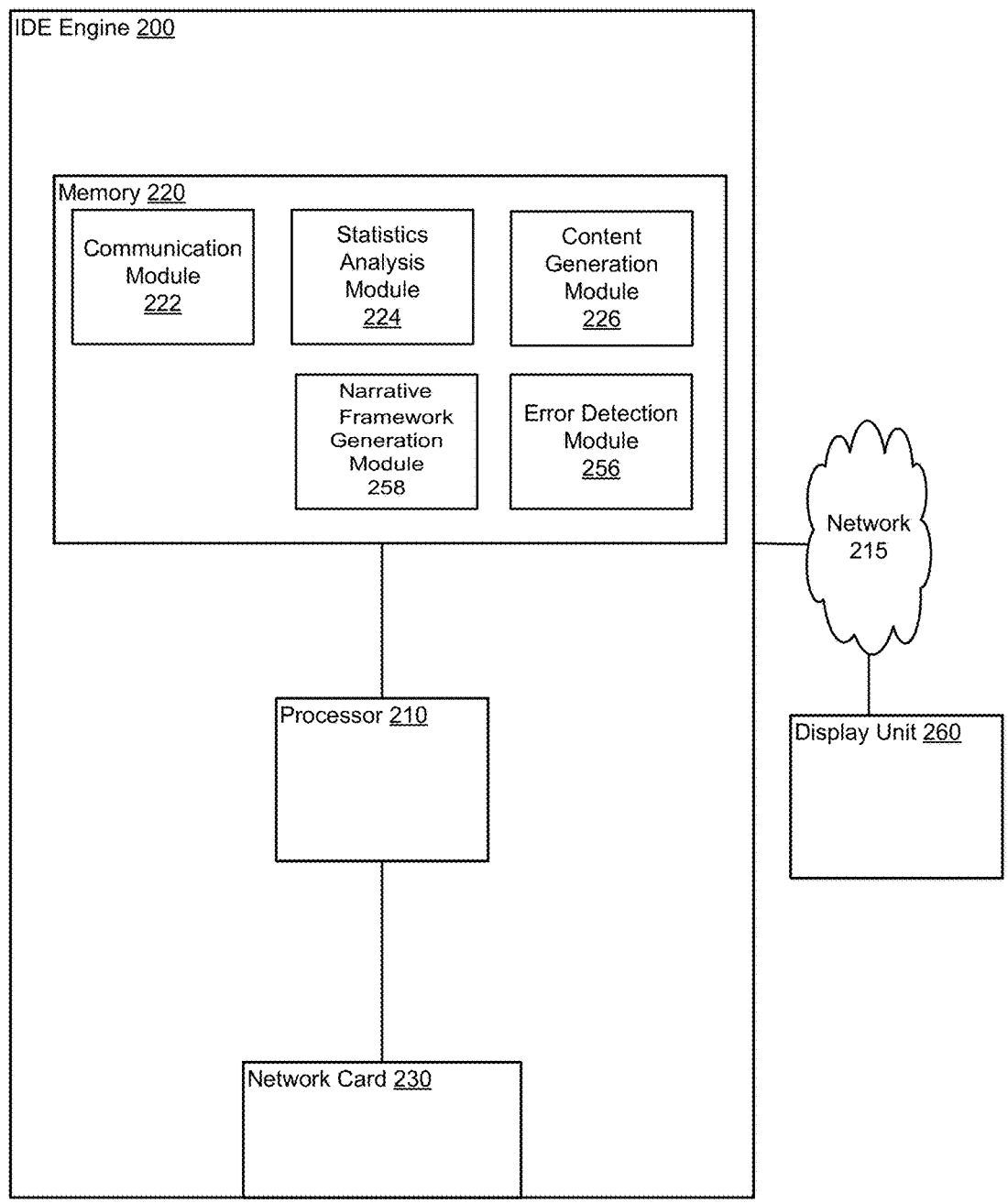
FIG. 2 is a schematic diagram that illustrates an integrated development environment (IDE) engine according to another embodiment.

Turning to FIG. 2, which is an expanded view of an exemplary implementation of a schematic diagram that illustrates an integrated development environment (IDE) engine. This figure presents a system block diagram of an exemplary internal construction of an IDE engine 200. The IDE engine 200 includes a processor 210 operatively coupled to a memory 220 and to a network card 230. In this non-limiting example of an IDE engine internal composition, the memory 220 includes five software modules: a communication module 222, a statistics analysis module 224, a content generation module 226, an error detection module 256, and a narrative framework generation module 258. The IDE engine 200 is coupled via network 215 to a display unit 260 on a client device. In alternative non-limiting embodiments, the IDE engine 200 can include additional hardware modules and/or software modules (executing in hardware) not shown in FIG. 2.

The memory module 220 can include the communication module 222, the statistics analysis module 224, the content generation module 226, the error detection module 256, and the narrative framework generation module 258. In some embodiments, the memory 220 can include instructions (e.g., code) sufficient to define and/or execute the communication module 222, the statistics analysis module 224, the content generation module 226, the error detection module 256, and the narrative framework generation module 258.

The narrative framework generation module 258 can include software instructions (e.g., code) configured to cause the processor 210 to define a narrative framework based at least in part on information received from a statistics provider, pre-stored information, and user-provided information. As discussed herein, a narrative framework generated by the IDE engine 200 can be used to define a narrative content portion (e.g., an article, report, summary, preview, bullet point, short-form text, etc.) and send one or more phrases that collectively define the narrative framework to the template generation module 258.

In a non-limiting embodiment, a narrative framework can be associated with one or more phrases; each phrase can be selected from one or more phrase variations. Further, phrases and/or phrase variations can be, for example, words, phrases, sentences, paragraphs, text elements, etc. portions or, combinations thereof. In a non-limiting example, a narrative framework can include a first paragraph and a second paragraph. The first paragraph can be selected from two paragraph variations and the second paragraph can be selected from three paragraph variations. In an additional non-limiting example, a narrative framework can include more or fewer phrases/paragraphs, each selected from any number of phrase variations, the IDE engine 200 (e.g., the error detection 256 included therein) detects an error when the first phrase fails to satisfy a criterion relative to the second phrase. In one non-limiting example, a criterion can be based on the first phrase being grammatically consistent with the second phrase.

In some embodiments, the narrative framework generation module 258 generates a preview narrative framework that has a substantively similar "look and feel" as the narrative content portion. Such a preview narrative framework (typically includes sample data from a statistics provider) allows a user to review how a hypothetical narrative content portion will look when the defined narrative framework is used to characterize an event. The sample data included in the preview narrative framework can relate to a statistic of an event. In an exemplary embodiment, a user can, in addition to reviewing a narrative framework, interact with the narrative framework as it is being defined, e.g., for purposes of editing and making changes to the narrative framework. User-provided information/text can be in the form of configuration options, text, parameters, thresholds, criteria, and the like.

In an exemplary embodiment, the phrases or phrase variations to be included in a narrative framework can be entered by a user or they can be pre-stored in the IDE engine 200, or a narrative framework database. In such an instance, the IDE engine 200 can receive a first phrase variation and a second phrase variation, for example, from a client device in response to a user input. Then, the IDE engine 200 compares the first phrase variation and the second phrase variation to determine an error, e.g., when the first phrase variation fails to satisfy a criterion relative to the second phrase variation. If there is no error, the IDE 200 engine can continue with receiving one or more phrase variations, if any, or otherwise finalize the narrative framework. However, if there is an error, then the IDE engine 200 can receive an alternate phrase variation, the alternate phrase variation different from the second phrase variation. Should the received alternate phrase variation also fails to satisfy a criterion relative to the first phrase variation, another alternate phrase variation may be received. The alternate phrase variation that satisfies the criterion relative to the first phrase variation may be selected for use in place of the second phrase variation and any preceding alternate phrase variations.

In instances where one or more errors occur, the defined narrative framework can include the first phrase variation and the selected alternate phrase variation and not the second phrase variation. Also, in such instances, the preview narrative framework (e.g., defined as a part of a narrative framework generation method) includes the first phrase variation and the selected alternate phrase variation and not the second phrase variation, the first phrase variation modified based on sample data relating to a statistic of an event. In instances where sample data is pre-stored in a narrative framework database, the IDE engine 200 (via an IDE server) can present, in whole or in part, the prestored sample data for receiving, from the user, a selection corresponding to the sample data in the pre-stored sample data. In a non-limiting example, the portion of the narrative framework deemed to be in error by the IDE engine 200 can be shown with a different font, error boxes, underlining, error messages, error codes, or any suitable GUI indications.

In an exemplary embodiment, the phrases or phrase variations, can include or, otherwise be associated with each other by one or more operators. For example, the operators can include relational and/or logical operators. If the operators are associated in a manner that causes the first phrase to fail to be uniquely associated with the second phrase, then an error can be indicated. Thus, an IDE engine can detect logical errors in combination with defining a narrative framework. If one or more logical errors are detected, the IDE engine 200, can receive one or more sets of operators from a user. However, if no logical errors, etc. are detected, the IDE engine 200 can continue receiving one or more phrase variations and/or operators, if any, or otherwise finalize the narrative framework. In a non-limiting example of narrative framework generation, an expression "$A OR $B AND $C," can be ambiguous and interpreted as either "($A OR $B) AND $C" or alternatively as "$A OR ($B AND $C)." In this example, "OR" and "AND" are standard Boolean operators. Thus, with reference to this example, the IDE engine 200 can detect a logical error in the expression, and notify the user with an error indication. To minimize such conditional errors, a user can supply sets of parentheses "()" operators to be included in the expression to provide greater precision in evaluating the expression.

In some embodiments, the narrative framework generation module 258 can associate (or, assign) a narrative framework type for use in selecting a narrative framework itself. The narrative framework type can be determined based on, for example, a narrative framework type identifier received in conjunction with the event ID. Alternatively or additionally, the narrative framework type can be determined based at least in part on a content type associated with one or more virtual events (e.g., information, data and/or statistics associated with a video game, a fantasy sports league and/or team, etc.), including an occurrence, fact, character, result and/or other information about which the narrative content will be defined. The narrative framework type can be, for example, an event preview narrative framework type, an in-progress event report narrative framework type, an event summary narrative framework type, as well as custom types created by a user.

A narrative framework type can be of any of the following narrative framework types: game preview, in-game progress report, game recap, tournament preview, tournament recap, financial reports (e.g., based on an organization's performance quarterly, annually, etc.) and the like. Alternatively, if an event ID (e.g., corresponding to an event) is associated with an organization-driven event, such as an organization-driven request for long-form or short-form content associated with an occurrence, idea, etc., the narrative framework can be a short-form report narrative framework type, an email narrative framework type, a comparison narrative framework type, an annual investor report type, a fiscal report type, a sustainability report type, or a custom narrative framework type developed in response to a client request.

The content generation module 226 can include software instructions (e.g., code) configured to cause the processor 210 to define new narrative content (e.g., an article, an email, a report, a summary, a preview, one or more bullet points, one or more sentences, one or more paragraphs, a vignette, etc.). Such narrative content can include one or more phrase variations, the one or more phrase variations associated with text elements (e.g., phrases, sentences, paragraphs, etc. or, a combination thereof). Thus, the content generation module 226 can select phrase variations as well as text elements included therein.

The content generation module 226 can select a narrative framework (in real time or pre-stored in a narrative framework database) for use in defining the narrative or the narrative content portion. Once a narrative framework is selected, the content generation module 226 can determine, define, or select a narrative tone to be associated with the new narrative content portion. In some embodiments, the content generation module 226 can analyze the received statistics and/or other information to determine which narrative tone would be appropriate based on the received information.

The content generation module 226 can next define a narrative content portion using the selected narrative framework. In some embodiments, each phrase (e.g., portion of language and/or variable identifiers) included in the narrative framework can be associated with multiple phrase variations. In such embodiments, the content generation module 226 can, for each phrase from the narrative framework, first select (e.g., randomly select, select under rule guidance) a single phrase variation from the multiple phrase variations associated with that phrase, and then write the text and/or data included in that selected phrase variation to the narrative content portion in lieu of the original phrase and/or phrase identifier included in the selected narrative framework.

The error detection module 256 can include software instructions implemented in software code configured to cause the processor 210 to detect an error when one or more phrases fails to satisfy a criterion. Further, the phrases, in some embodiments, can include or, otherwise be associated with each other, by one or more operators. In a non-limiting example, the operators can include Boolean, relational, and/or other logical operators. In such instances, the error detection module 256 can detect an error when the operators are associated in a manner that causes the first phrase to fail to be uniquely associated with any second or alternate phrase.

Upon detection of an error, the error detection module 256 can be configured to communicate the error indication to the narrative framework generation module 258 such that the narrative framework generation module 256 can take appropriate action in defining a narrative framework. In such an embodiment, upon receiving the error indication from the error detection module 256, the narrative framework generation module 258 can be configured to receive one or more different phrases and/or one or more different operator(s). As discussed previously herein, in some instances, the narrative framework generation module 258 provides indication of the error to a user.

The communication module 222 can include software instructions (e.g., code) configured to cause the processor 210 to exchange information (e.g., data packets, data cells) with another hardware device. In a non-limiting example, the communication module 222 can include instructions configured to cause the processor 210 and/or the network card 230 to receive statistics and/or other information from a statistics provider. The communication module 222 can also include instructions configured to cause the processor 210 and/or the network card 230 to exchange one or more data packets with one or more databases.

The statistics analysis module 224 can include software instructions (e.g., code) configured to cause the processor 210 to analyze one or more statistics and/or other information received and/or stored at the IDE engine 200 (at, e.g., the memory 220 and/or another memory included in and/or coupled to the IDE engine 200). For example, the statistics analysis module 224 can be configured to compute one or more derivative statistics and/or metrics based at least in part on received statistics and/or other information such as statistics received/stored from/at the narrative framework database 150 and/or the content generation module 226.

The display unit 260, on a client device 160, can be, for example, a liquid crystal display (LCD) unit or a light emitting diode (LED) alpha-numeric display unit that can display a GUI generated by the IDE Engine 200. The Integrated Development Environment (IDE) generated by the IDE Engine 200 is considered to include a GUI. In some embodiments, the GUI is delivered via an IDE server, and is displayed on the display unit 260. In some embodiments, the GUI presented allows one or more users to interact with the IDE Engine 200.

The network card 230 can be operatively and/or physically coupled to the processor 210. In this manner, the processor 210 can, via the network card 230, exchange information with one or more other devices via a network 215.

Figure 3:
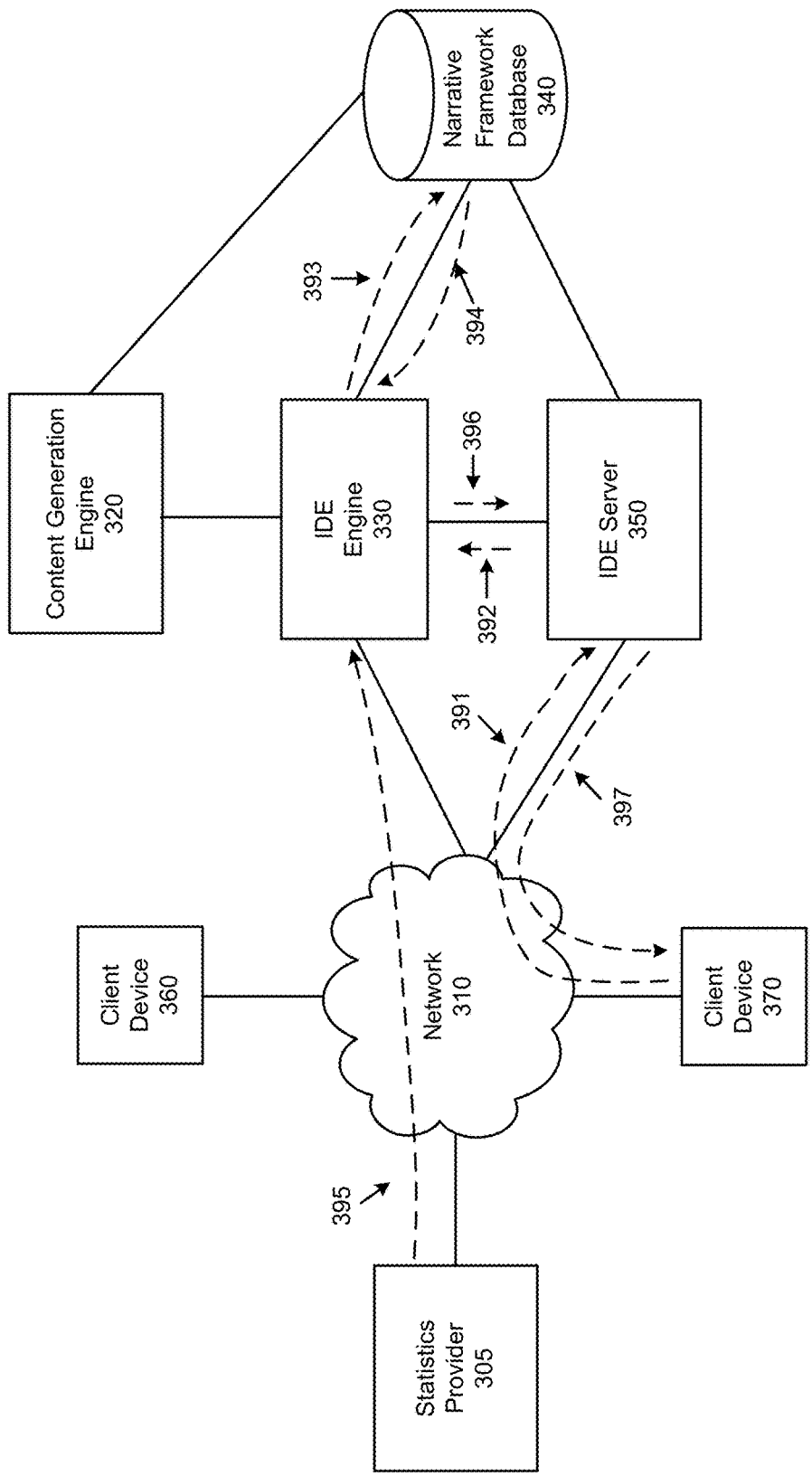
FIG. 3 is a schematic block diagram that illustrates a narrative framework generation system, according to another embodiment.

Turning now to FIG. 3, this figure presents a schematic block diagram 300 that illustrates a narrative framework generation system for generating narrative frameworks. The IDE engine 330 is operatively coupled to a statistics provider 305 (via a network 310), a content generation engine 320, an IDE server 350, and a narrative framework database 340. The IDE server 350 is coupled to the IDE engine 330 and the narrative framework database 340, and via the network 310, to a client device 360 and to a client device 370. The system 300 can be similar to system 100 and can include similar components as included therein.

In an exemplary embodiment, a user operating a client device 370 can define a narrative framework. Accordingly, a client device 370 can send a data communication 391 to the IDE server 350 via the network 310, in response to a user input. The data communication 391 can be formatted for transmission over a network communication channel, for example, an Ethernet packet, a data cell, and/or the like, and can include data, statistics and/or a request for defining a narrative framework related to an event. Such a request can be formatted according to the Hypertext Transfer Protocol (HTTP) or other known protocol. For example, the request can be sent from a web browser or other client application executing at the client device 370. Alternatively, the request can include a subject ID associated with a subject or topic to be described in the new narrative framework. An event can, in some embodiments, be identified by an event ID. A narrative framework can be defined in anticipation of a future potential event, at a termination of a given event associated with the event ID (e.g., a sporting event), at periodic time intervals in connection with a predefined schedule, etc.

The IDE server 350 communicates a client request as a data communication 392 for defining a narrative framework to the IDE engine 330. Upon receipt of the data communication 392 from IDE server 350, the IDE engine 330 can query the narrative framework database 340 via data communication 393 that includes a request for phrase variations, statistics and/or other information (e.g., a database request, such as a Structured Query Language (SQL) query) for use in defining new narrative frameworks. In an exemplary embodiment, the request can include a reference identifier, such as an event ID associated with a real-world event or occurrence, a virtual-world event, etc.

The narrative framework database 340 responds with a data communication 394 that can include, for example, a set of phrase variations associated with defining a narrative framework. In some embodiments, the data communication 394 can also include criterion, text, thresholds, parameters, statistics, data and/or other relevant information for use by the IDE engine 330 in defining the new narrative framework. In some embodiments, a statistics provider 305 can provide information associated with the specified event to the IDE engine 330 via a data communication 395. Such information can be used in defining a narrative framework.

During the definition of a narrative framework, a user operating a client device 370 can review and interact with the narrative framework, for example, in connection with providing/selecting phrases, phrase variations, variable identifiers, operators, thresholds, parameters, criteria associated with comparing phrases/phrase variations, and/or any information applicable to defining a narrative framework. In some embodiments, a user can also provide sample data to be included in a preview narrative framework. A user can thus review and/or edit a narrative framework as it is being defined in real time.

Once a narrative framework has been defined, the IDE engine 330 sends a data communication 396 to the IDE server 350. In some embodiments, the data communication 396 includes a preview narrative framework, in whole or in part, that has a substantively similar "look and feel" as a narrative content portion that can be created using the defined narrative framework. Such a preview narrative framework allows a user to review how a hypothetical narrative content portion will look when the defined narrative framework is used to characterize an event. The sample data included in the preview narrative framework can relate to a statistic of an event. The IDE server 350 communicates the narrative framework defined by the IDE engine 330 to the client device 370 via a data communication 397. In some embodiments, this data communication 397 can include Hypertext Markup Language (HTML) content for transmission to a web browser executing at the client device 370.

In some embodiments, the IDE server 350 can receive a request for a previously-defined narrative framework from client device 370 via data communication 391. Accordingly, the IDE server 350 can query the narrative framework database 340 for such a previously-defined narrative framework stored in narrative framework database 340. In turn, the narrative framework database 340 can respond with the requested narrative framework. Such a narrative framework can be then presented by the IDE server 350 for display on a display unit of client device 370. In an exemplary embodiment, the content generation engine 320 can request the narrative framework database 340 for narrative frameworks stored in narrative framework database 340. Subsequently, the narrative frameworks can be used by the content generation module 320 in defining narrative content portions or narrative portions.

Figure 4:
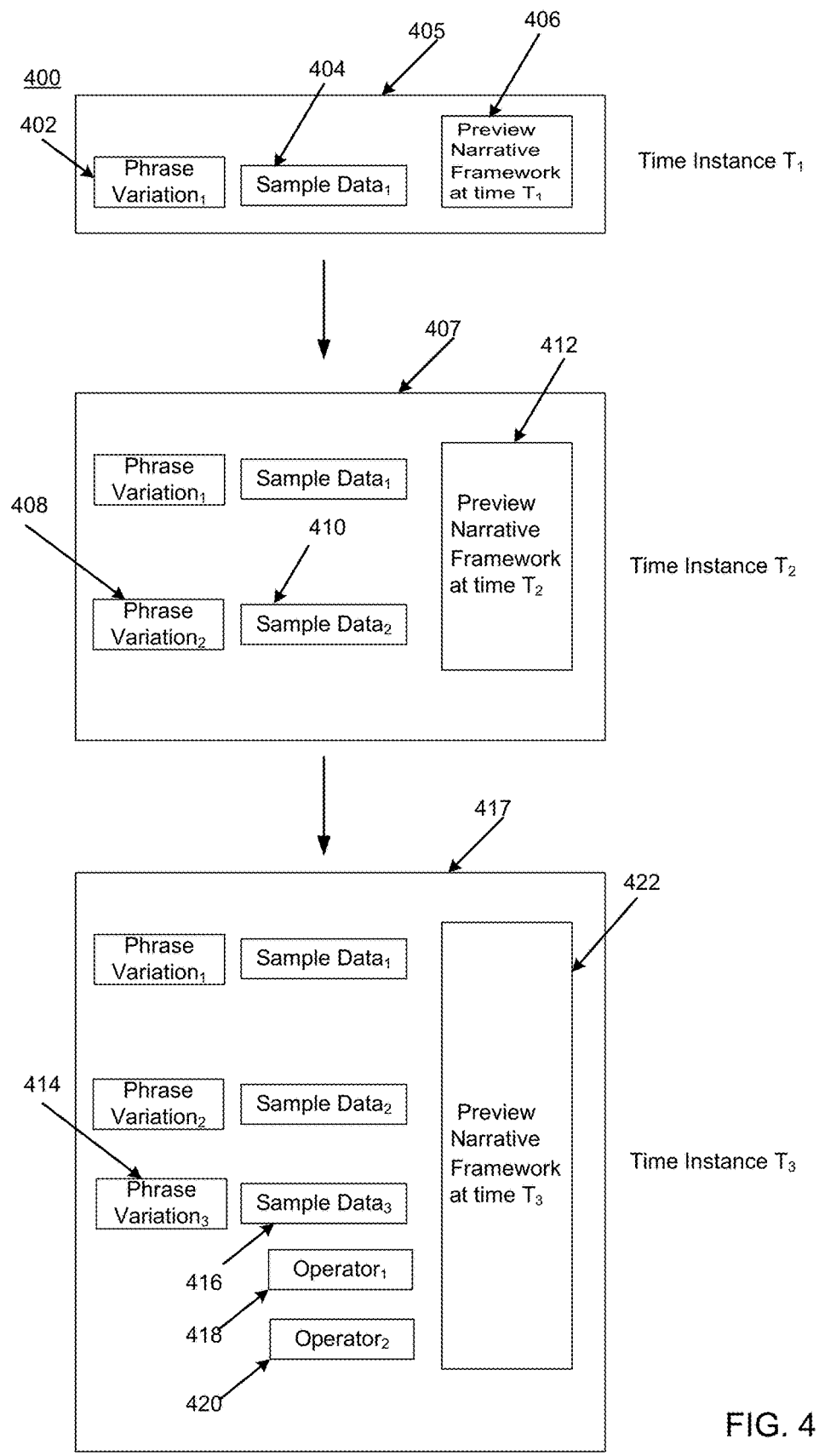
FIG. 4 is a block diagram that illustrates a process of receiving phrase variations at different time instances and defining a narrative framework based thereon, according to another embodiment.

Turning now to FIG. 4, this figure presents a block diagram 400 that illustrates receiving phrase variations at different time instances and simultaneously defining a narrative framework based thereon. Specifically, the figure illustrates a set of preview narrative frameworks 406, 412 and 422 at time instances T1, T2 and T3 (T3>T2>T1), e.g., as the narrative frameworks are being defined in real time. A request for defining a narrative framework can be initiated by a user operating a client device. In an exemplary embodiment, the request to define a narrative framework can be after an event has already taken place. The request to define a narrative framework can be proactive, i.e., in anticipation of a future potential event. In an alternative embodiment, the request to define a narrative framework can be based on a predetermined schedule or triggered in response to an initial real-world event or occurrence, such as a completion of an event, meeting, sports game or match, end of a fiscal quarter at an organization, etc. Additionally, the request to define a narrative framework can be based triggered in response to a virtual-world event, such as a completion of a video game, a fantasy league (e.g., a fantasy sports league) competition or matchup, etc.

After receiving a request to define a narrative framework, an IDE engine can receive one or more phrase variations from the user or from a narrative framework database. In addition, in some embodiments, an IDE engine can also receive sample data related to an event. The sample data can be provided by a user, a statistics provider, or pre-stored in a narrative framework database.

In a non-limiting example, at time instance T1, a first phrase variation 402, "Phrase Variation 1" and a first set of sample data 404 "Sample Data 1" are received at an IDE engine, and accordingly included in a preview narrative framework 402. Preview narrative framework 406 is displayed to the user via Graphical User Interface (GUI) 405, at time instance T1. At time instance T2, a second phrase variation 408, "Phrase Variation 2" and a second set of sample data 410 "Sample Data 2" are received, and included in a preview narrative framework 412. Thus, at time instance T2, preview narrative framework 404 includes "Phrase Variation 1," "Phrase Variation 2," "Sample Data 1," and "Sample Data 2." Preview narrative framework 412 is displayed to the user via Graphical User Interface (GUI) 407, at time instance T2. At time instance T3, a third phrase variation 414, "Phrase Variation 3," a third set of sample data 416 "Sample Data 3" and two sets of operators 418, 420 ("Operator 1" and "Operator 2") are received, and included in a preview narrative framework 422. Thus, at time instance T3, preview narrative framework 404 includes "Phrase Variation 1," "Phrase Variation 2," "Sample Data 1," "Sample Data 2," "Sample Data 3," "Operator 1," "Operator 2." Operators can be used to create associations between one or more phrase variations. Thus, "Phrase Variation 3" can be associated with "Phrase Variation 1" and "Phrase Variation 2" via "Operator 1" and "Operator 2." Preview narrative framework 422 is displayed to the user via Graphical User Interface (GUI) 417, at time instance T3.

In an exemplary embodiment, an IDE engine performs various checks to determine that the narrative framework is free from logical errors, computational errors, statistical errors, syntax errors, run-time errors, and the like. For example, the IDE system can perform a check at time instance T2 that "Phrase Variation 1" is grammatically consistent with "Phrase Variation 2." Again, at time instance T3, the IDE engine can check that "Phrase Variation 1," "Phrase Variation 2," and "Phrase Variation 3" are grammatically consistent with each other.

In an alternative exemplary embodiment, a narrative framework includes two phrases, wherein a first phrase includes two phrase variations, and a second phrase includes three phrase variations, an IDE engine 200 performs a multistage grammar check to determine that the phrase variations are grammatically consistent. In this error check, an IDE engine 220 can perform six different error checks, based on comparing different combinations of the six phrase variations using the two phrase variations in the first phrase and the three phrase variations in the second phrase.

In an exemplary embodiment, the IDE engine 200 performs a first multistage grammar check prior to inclusion of the sample data, and then a second multistage grammar check after inclusion of sample data, i.e., the second multistage being performed on the preview narrative framework. More than one set or type of sample data can be included as a part of a preview narrative framework. Thus, the second multistage grammar check can be performed repeatedly on different sets of sample data. Further, repeating the second multistage grammar check using different sets of sample data can indicate a greater possibility of errors in a narrative framework. In one such scenario applicable to an event such as a baseball game, a phrase variation (included in a narrative framework) is a sentence "$HOME_TEAM_NAME$ needs a $PLAYER_POSITION$ that can play really well." Using a first set of sample data, if "shortstop" is inserted in "$PLAYER_POSITION$," then this sentence is grammatically correct. If a second set of sample data is used, in which "outfielder" is inserted in "$PLAYER_POSITION$," then the IDE engine 200, can detect an error. This is because, using the second set of sample data, the phrase variation should be the sentence $HOME_TEAM_NAME$ needs an $PLAYER_POSITION$ that can play well."

Additionally, in this exemplary embodiment, the IDE engine can, at time instance T3, check that "Operator 1" and/or "Operator 2" creates a unique association between "Phrase Variation 1," "Phrase Variation 2," and "Phrase Variation 3." However, it will be apparent to one of ordinary skill in the art that additional alternate phrases may be used in this comparison and error determination in place of any or all of the Phrase Variations herein presented. In case one or more errors are detected at any time instance, the IDE engine displays the error(s). A user can review such errors (typically presented to a display unit on a client device by an IDE server) and fix such errors as necessary. In some embodiments, the IDE engine automatically fixes the errors, in whole or in part, without requiring any user feedback.

Figure 5:
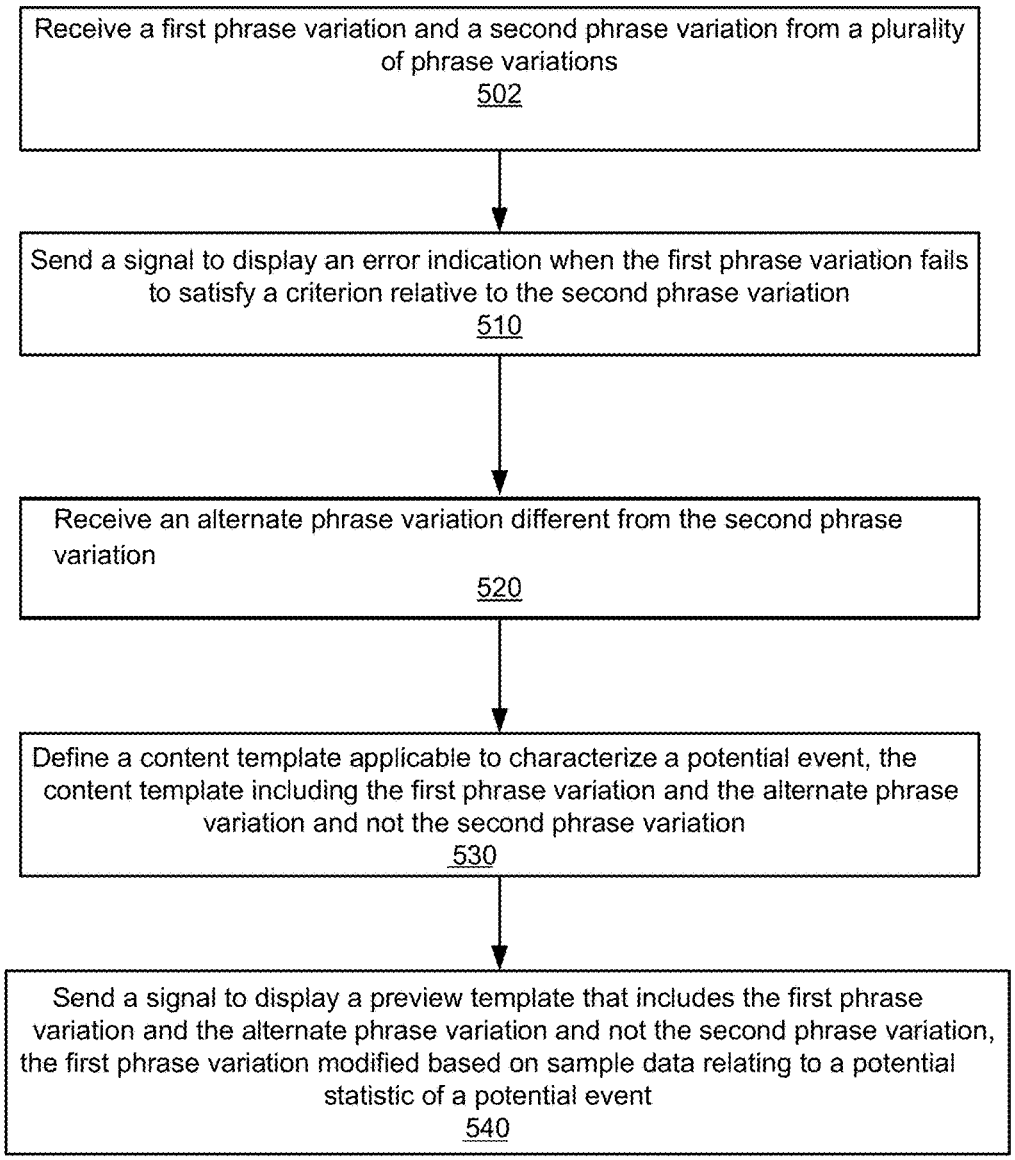
FIG. 5 is a flow diagram that illustrates a method of defining a narrative framework, according to another embodiment.

Turning to FIG. 5, this figure presents an exemplary view of a method of defining a narrative framework that can be applicable to characterize an event. Such a narrative framework can be based, at least in part on information received from a statistics provider, pre-stored information, and user-provided information. As discussed previously herein, a narrative framework generated by an IDE engine can be used to define a narrative (e.g., an article, report, summary, preview, bullet point, short-form text, etc.). Further, as discussed previously, the narrative is related to one or more statistics based on an occurrence selected from the following group: a business event, a current event, a historical event, a virtual event, a sports event, a player performance during an in-progress sporting event, a financial prediction, an email request.

In this exemplary embodiment, the method 500 shows that a server device receives a first phrase variation and a second phrase variation from a set of phrase variations, at 502. The server displays an error indication when the first phrase variation fails to satisfy a criterion relative to the second phrase variation, at 510. For example, the criterion can be based on a context associated with the potential event. In another example, an error can be detected 525 when the first phrase variation is grammatically inconsistent with the second phrase variation. In response to the error indication 525, the method 500 receives an alternate phrase variation different from the second phrase variation, at step 520 and performs the error check 525 again. If an error is detected 525 between the first phrase variation and the received alternate phrase variation, an additional alternate phrase variation may be received to replace the previously received alternate phrase variation. This method step may recur as many times as necessary to select a phrase variation with which there are no detected errors 525 between the first phrase variation and the selected alternate phrase variation. A narrative framework (or, content narrative framework) applicable to characterize an event is defined that includes the first phrase variation and the selected alternate phrase variation and not the second phrase variation, at 530. Such an event can have already occurred in the past, is currently occurring, or can be occurring in the future.

In a non-limiting example involving generating internal reports for an organization, an IDE engine receives a request from a user at the organization to define a narrative framework. For example, the IDE engine receives a first phrase variation that is a sentence "[D]espite declining by $PERCENTAGE$ cash flow reserves of $ORGANIZATION_NAME$ remained high above $DOLLAR_AMOUNT$ for the fiscal year ending $MONTH_NAME$ $YEAR_NAME$." Next, the IDE engine receives a second phrase variation that is a sentence "[T]he cash flow reserves of $ORGANIZATION_NAME$ never declined and continued to rise during the fiscal year ending $MONTH_NAME$ $YEAR_NAME$." For each variable identifier included in the afore-mentioned phrase variations, sample data can be received from a user, a narrative framework database, or a statistics provider and corresponding to that variable identifier. Examples of sample data can include and are not limited to: a statistic, datum, name, a numerical or lexicographical value, etc. Additionally, the first, second, and third phrase variations can be received from a user or a narrative framework database, in embodiments of the present disclosure.

In some embodiments, the IDE engine detects that the first phrase variation fails to satisfy a criterion relative to the second phrase variation. In the above-mentioned example, the first phrase variation indicates that the cash flow reserves of an organization declined by a certain percentage. The second phrase variation, however, indicates that the cash flow reserves of an organization never declined and continued to rise during a fiscal year. Accordingly, the IDE engine detects that there is a contextual error as the first phrase variation is inconsistent with the second phrase variation. Consequently, the IDE engine receives an alternate phrase variation that is a sentence "$ORGANIZATION_NAME$ had a steady cash flow for the months of $TIME_INTERVAL$ but a declining cash flow during for the months of $TIME_INTERVAL$." If the IDE engine does not detect any error with respect to the alternate phrase variation, the alternate phrase variation becomes the selected alternate phrase variation and a content narrative framework is defined applicable to characterize the performance of the organization. The content narrative framework can include the first phrase variation and the selected alternate phrase variation, but not the second phrase variation.

In an exemplary embodiment, the user at the organization who requested to define a narrative framework can view the narrative framework as it is being defined. Further, in some embodiments, the user can review errors detected by the IDE engine as the narrative framework is being defined. If there is no error, the IDE engine can continue with receiving one or more phrase variations, if any, or otherwise finalize the narrative framework.

The IDE engine generates a preview narrative framework that includes the first phrase variation and a selected alternate phrase variation and not the second phrase variation. Such a preview narrative framework can further include sample data corresponding to the variable identifiers in the first phrase variation and the alternate phrase variation. Thus, a preview narrative framework can be "[D]espite declining by 7% cash flow reserves of Acme Coffee remained high above $51 billion for the fiscal year ending April 2014 . . . Acme Coffee had a steady cash flow for the months of July 2013-January 2014 but a declining cash flow during for the months of January 2014-April 2014."

Figure 6:
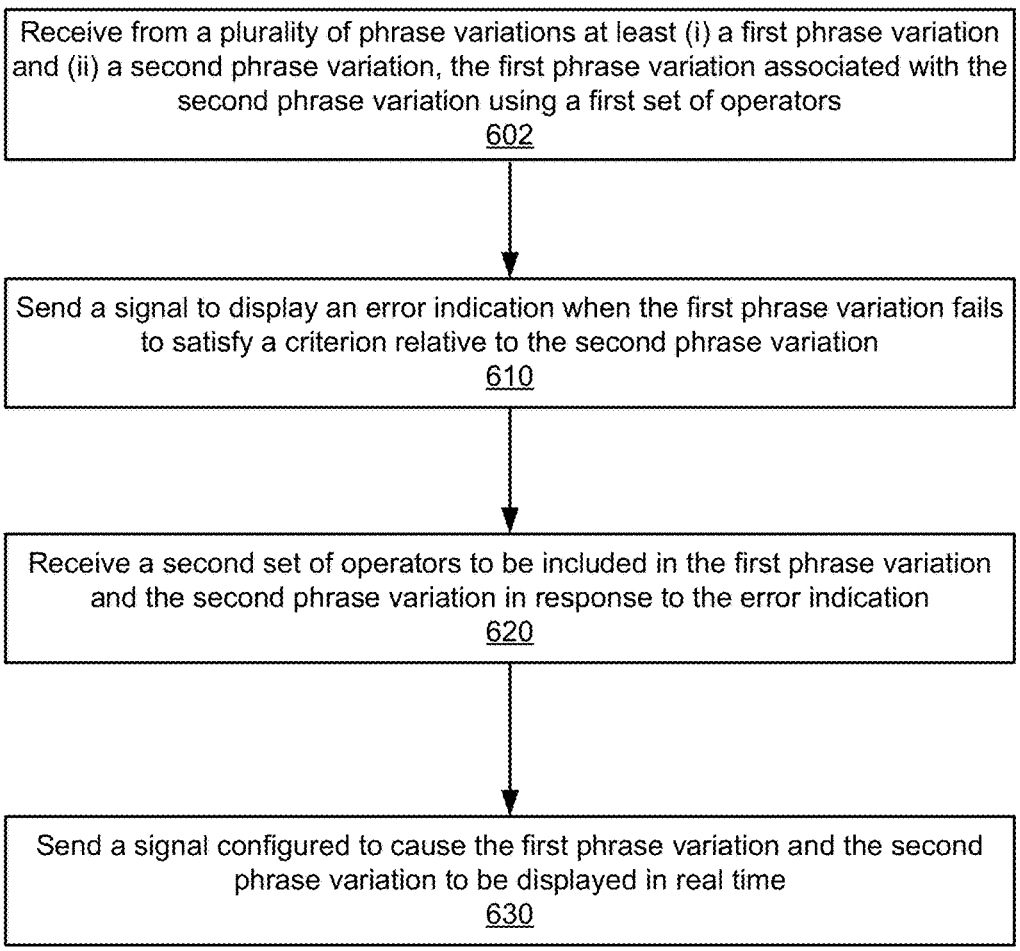
FIG. 6 is a flow diagram that illustrates a method of detecting logical errors in a narrative framework, according to another embodiment.

Turning to FIG. 6, this figure presents an exemplary view of a method 600 of detecting logical errors in a narrative framework. In this figure, a server device receives from a set of phrase variations at least (i) a first phrase variation and (ii) a second phrase variation, the first phrase variation associated with the second phrase variation using a first set of operators (e.g., relational operators or logical operators), at 602. The server device displays an error indication when the first phrase variation fails to satisfy a criterion relative to the second phrase variation, at 610. For example, the criterion can indicate that the first phrase variation is uniquely associated with the second phrase variation using the first set of operators. In response to the error indication, the method 600 receives a second set of operators to be included in the first phrase variation and the second phrase variation, at 620. The IDE server 150 displays the first phrase variation and the second phrase variation in real time on a display unit of a client device, at 630. In an exemplary embodiment, the first set of operators is included in the second set of operators. In an alternate exemplary embodiment, the first set of operators can be different from the second set of operators.

In response to an error indication, the IDE engine, in some embodiments, receives a second set of operators to be included in the first phrase variation. Thus, with respect to the above-mentioned example, the IDE engine receives the parenthesis operator "( )" as a second set of operators to be included in "$A OR $B." Accordingly, the IDE engine inserts the parenthesis operator around the first phrase variation, and displays the first phrase variation and the second phrase variation in real time. In other words, the IDE engine displays "($A OR $B) AND $C" to a display unit on a client device. It will be noted that the example if for illustrative purposes only. In embodiments of the present disclosure, an IDE engine 200 can detect a variety of errors including but not limited to logical errors, computational errors, statistical errors, syntax errors, run-time errors, and the like.

Figure 7:
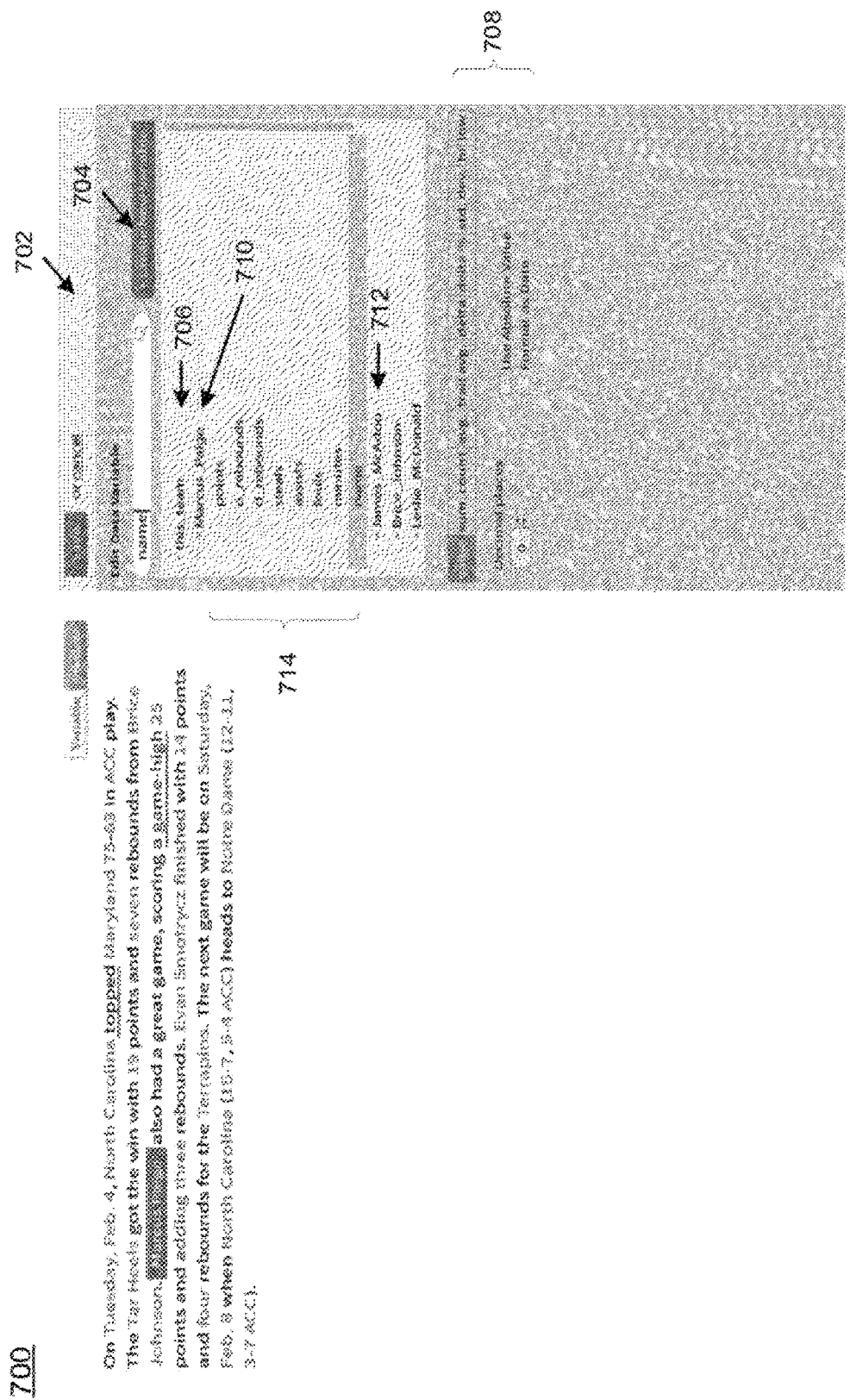
FIG. 7 is a screenshot of a Graphical User Interface ("GUI") that illustrates an exemplary preview narrative framework, as displayed to a user.

Turning to FIG. 7, this figure presents an exemplary view a screenshot of a GUI that illustrates an exemplary narrative framework 700. Specifically, narrative framework 700 is a preview narrative framework as displayed to a user. Narrative frameworks can be defined by an IDE engine simultaneously as the user is entering information. Users can review such narrative frameworks in real time while the narrative frameworks are being defined. Region 702 of narrative framework 700 shows a list of exemplary phrase variations (or, variables that are assigned values) associated with narrative framework 700. Phrase variations can be text or they can be numerical quantities. Accordingly, in many instances, phrase variations can have a sum, average, standard deviation, etc. as shown in region 708. Furthermore, phrase variations can involve decimal numbers. A user can provide a selection that causes the IDE engine to represent a phrase variation in various formats, such as according to a date format, as shown in region 708. In some embodiments, the phrase variations are pre-stored within a narrative framework database. In some embodiments, the phrase variations can be supplied by the user (e.g., as shown with "Create New Variable" tab 704). Narrative framework 700 also shows that phrase variations can have a hierarchical relationship. For example, a "this_team" phrase variation 706 can include branches such as a phrase variation 710 "Marcus_Paige," a phrase variation 712 "James_McAdoo"

and others. Each such branched phrase variation can further include "points," "o_rebounds," "d_rebounds," "steals" etc., as shown in region 714.

Figure 8:
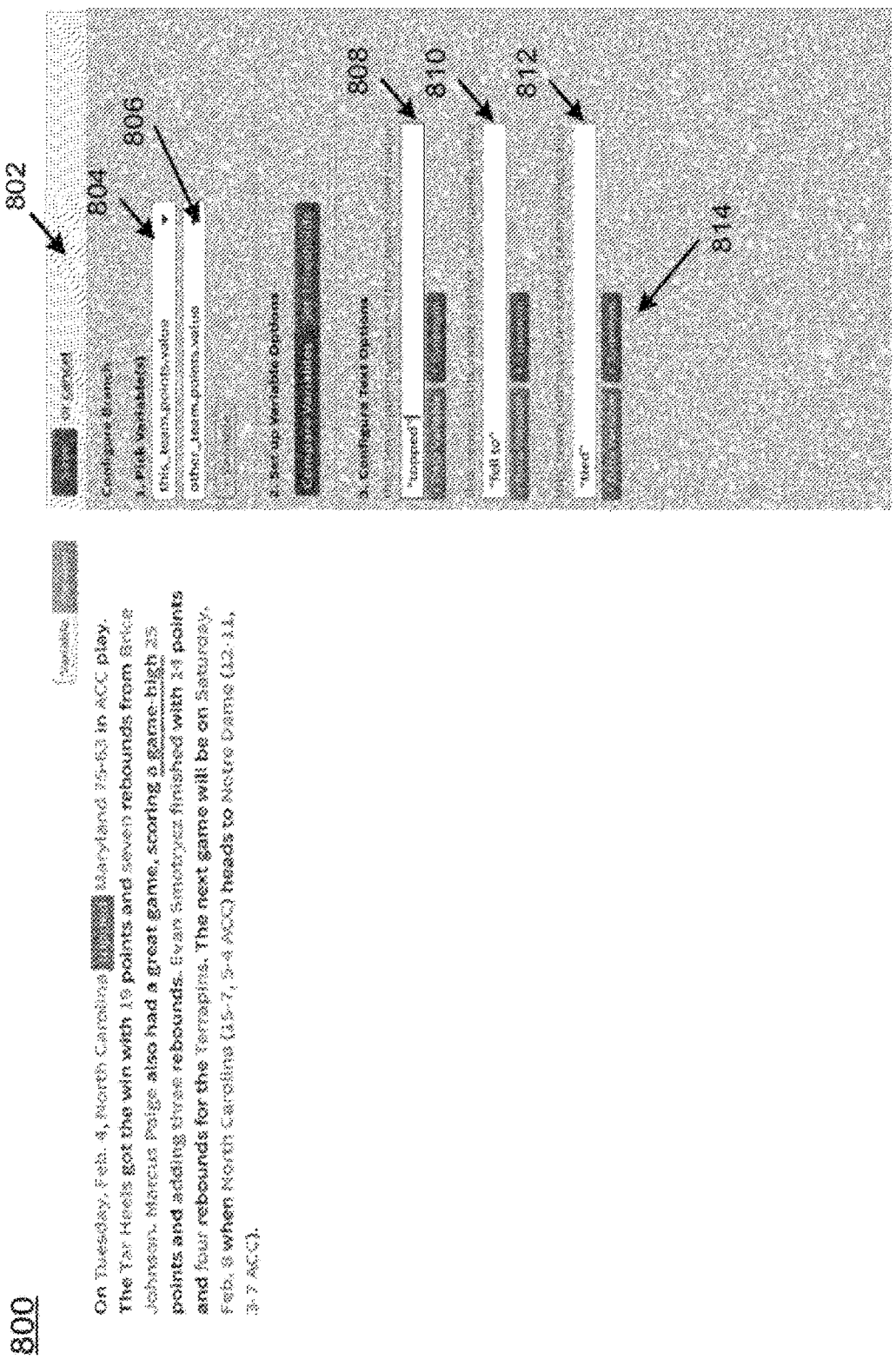
FIG. 8 is a screenshot of a GUI that illustrates configuration options available to a user for configuring an exemplary preview narrative framework, according to an embodiment.

Turning to FIG. 8, this figure presents an exemplary view of a screenshot of a GUI that illustrates configuration options available to a user for an exemplary narrative framework 800, according to an embodiment. Specifically, narrative framework 800 is a preview narrative framework as displayed to a user. Region 802 of narrative framework 800 shows a user can select phrase variation 804 "this_team-.points.value" and phrase variation 806 "other_team.points-.value" that can be used by an IDE engine as comparison criteria when selecting certain text or phrase variation. For example, as shown in region 808, if "this_team.points-.value" is greater than "other_team.points.value," then the phrase variation (e.g., a word) "topped" is used in the narrative framework. When "this_team.points.value" is less than "other_team.points.value," then the word "fell to" is used in the narrative framework, as indicated in region 810. If "this_team.points.value" is equal to "other_team.points-.value," then the word "tied" is used in the narrative framework, as indicated in region 812. Hence, this illustrates the flexibility of an IDE engine in formulating various criteria that can be used in defining narrative frameworks. In some embodiments (e.g., as shown in boxes 808, 810, and 812), a user can enter the text to be used in the defining the narrative framework. In some embodiments, an IDE engine can use pre-defined text to be used in defining the narrative framework. Button 814 in narrative framework 800 shows that an IDE engine, in an exemplary embodiment, allows users to enter synonyms for the text to be included in defining narrative frameworks.

Figure 9:
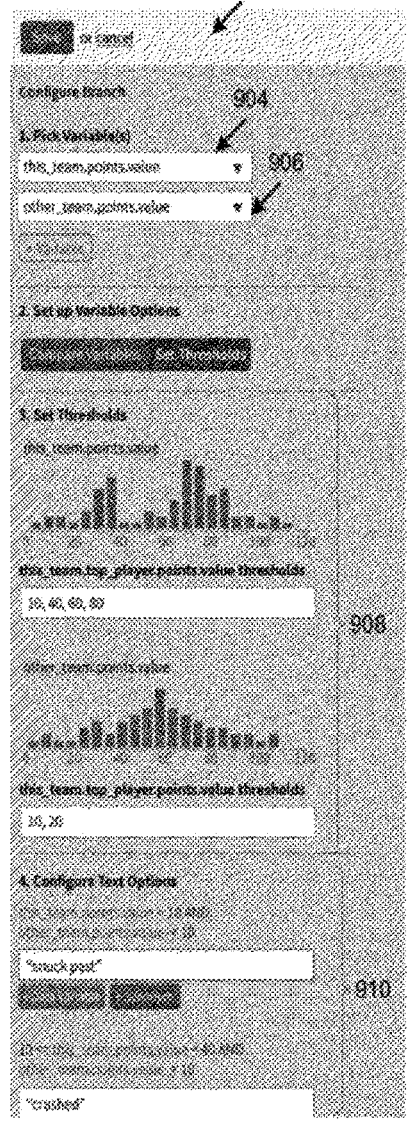
FIG. 9 is a screenshot of a GUI that illustrates configuration options available to a user for configuring an exemplary preview narrative framework, according to an embodiment.

Turning to FIG. 9, this figure presents an exemplary view of a screenshot of a GUI that illustrates configuration options available to a user for an exemplary narrative framework 900, according to an embodiment. Specifically, narrative framework 900 is a preview narrative framework as displayed to a user. Region 902 of narrative framework 900 shows a user can select phrase variation 904 "this_team-.points.value" and phrase variation 906 "other_team.points-.value" from a drop-down menu. Additionally, a user can configure one or more thresholds associated with each of these phrase variations, as indicated in region 908. Further, region 910 in narrative framework 900 shows that a user can set/configure text options when certain criterion associated with these phrase variations are satisfied. In an exemplary embodiment, an IDE engine automatically sets thresholds and other parameters for phrase variations as necessary.

Figure 10A:
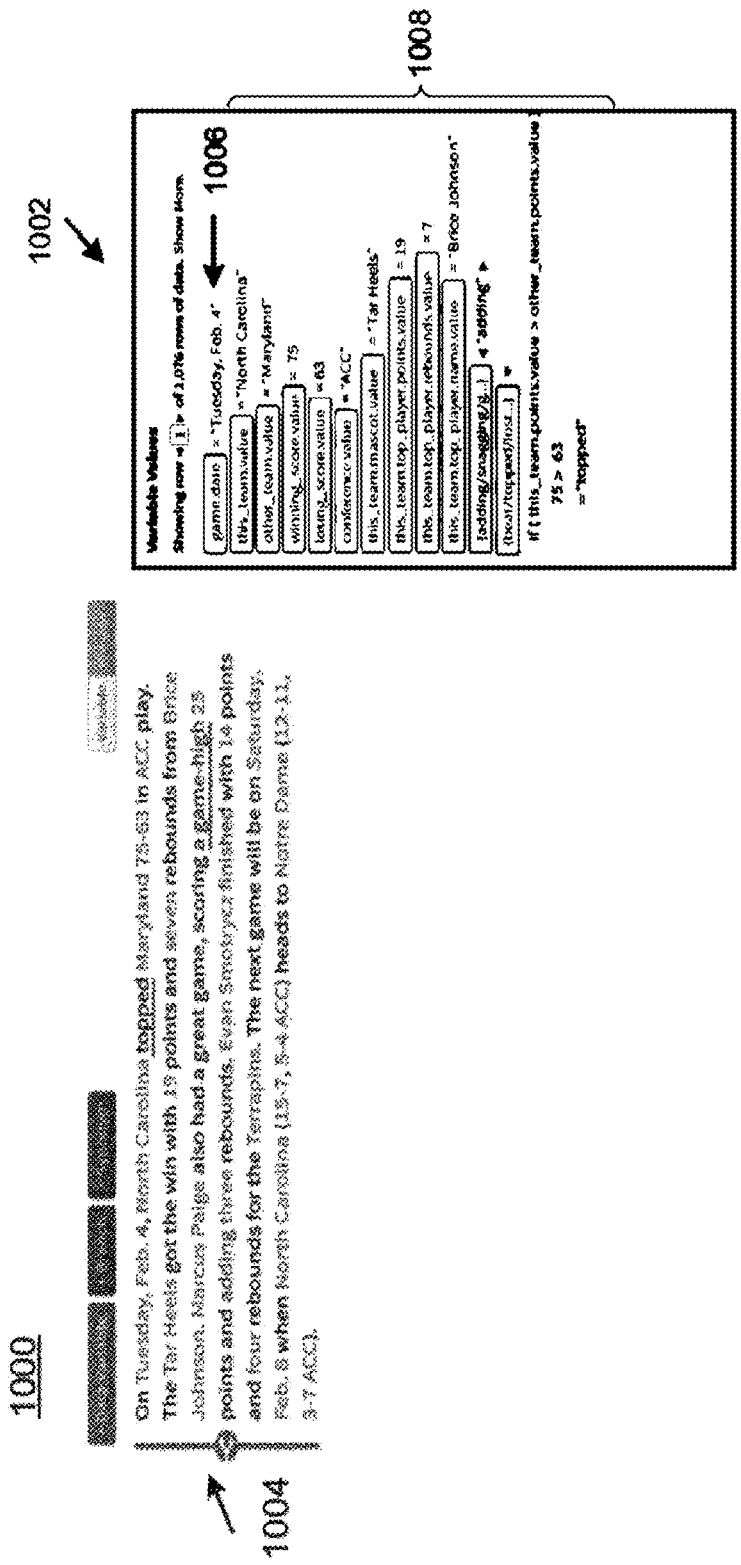
FIG. 10A is a screenshot of a GUI that illustrates an exemplary preview narrative framework at a first time.

Turning to FIG. 10A, this figure presents an exemplary view of a screenshot of a GUI that illustrates an exemplary narrative framework 1000 at a first time instance. Specifically, narrative framework 1000 is a preview narrative framework as displayed to a user. Region 1002 of narrative framework 1000 shows phrase variations and their associated values. For example, a "game_date" phrase variation 1006 is assigned a value "Tuesday, February 4." In addition, region 1008 highlights various criteria and text associated with other phrase variations used in defining narrative framework 1000. Region 1004 shows a paragraph (or, generally a narrative content portion) of narrative framework 1000 in real time.

Figure 10B:
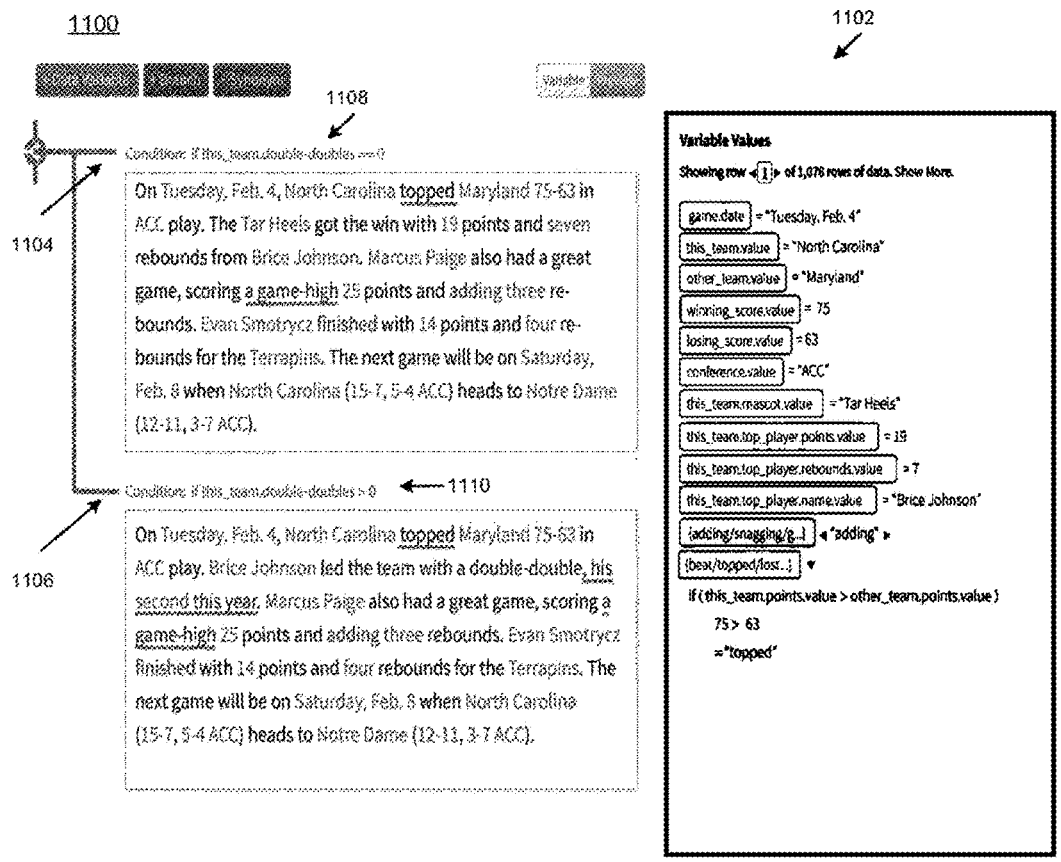
FIG. 10B is a screenshot of a GUI that illustrates an exemplary preview narrative framework at a second time.

Turning to FIG. 10B, this figure presents an exemplary view of a screenshot of a GUI that illustrates an exemplary narrative framework 1100 at a second time instance, after the first time instance. Screenshot at a first time instance is shown in FIG. 10A. Thus, region 1102 in narrative framework 1100 is substantively similar to region 1002 in FIG. 10A. Also, region 1104 in narrative framework 1100 is substantively similar to region 1004 in FIG. 10A. Specifically, narrative framework 1100 is a preview narrative framework as displayed to a user. In FIG. 10B, region 1106, shows a paragraph of narrative framework 1100 in real time. In some embodiments an IDE engine can select between two paragraphs or, more generally between two narrative content portions, based on one or more criteria, such as when one or more phrase variations fail to satisfy a criterion. In this non-limiting example, it is shown that an IDE engine selects the narrative content portion in region 1104 or the narrative content portion in region 1106 based on the criteria that a phrase variation "this_team.doubles-doubles" equals zero, or alternatively is greater than zero. Such criteria are shown in regions 1108 and 1110 respectively in narrative framework 1100.

Figure 11:
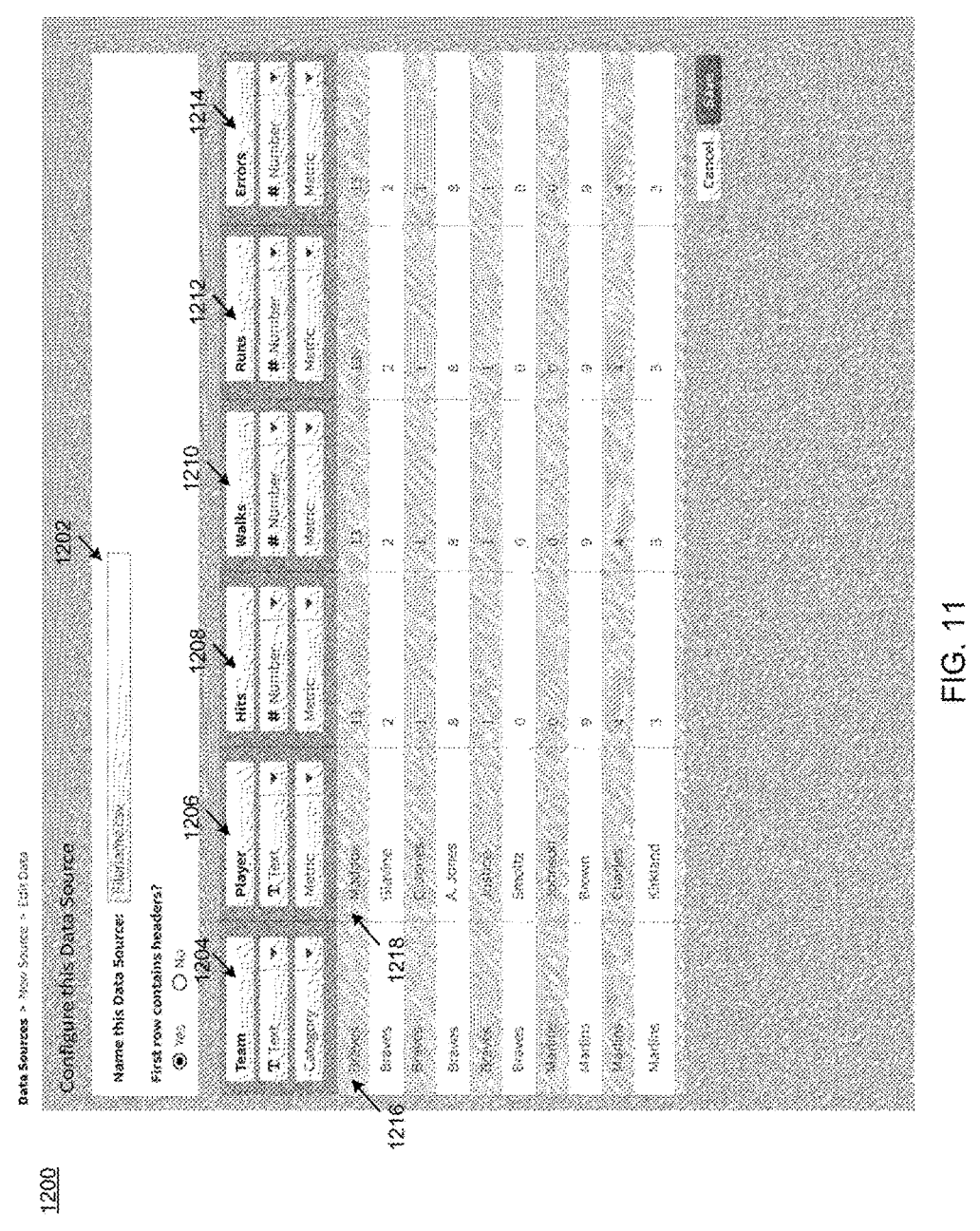

Turning to FIG. 11, this figure presents an exemplary view of a screenshot of a GUI that illustrates exemplary sample data 1200 relating to potential statistics of sports teams associated with a potential sports event. For example, region 1202 shows a data source named as "Filename.csv" having headers 1204, 1206, 1208, 1210, 1212, and 1214 respectively entitled: "Team," "Player," "Hits," "Walks," "Runs," "Errors." These headers can be associated with one or more phrase variations that can be used in defining narrative frameworks. In a non-limiting example, header 1204 is associated with a phrase variation 1216 "Braves." Header 1206 is associated with a phrase variation 1218 "Maddox," etc. Sample data relating to potential statistics can be pre-stored in the narrative framework database, provided by a statistics provider, provided by a user, or can be a combination of the above.

In examples discussed herein, a narrative framework has been associated with two phrase variations. In some embodiments, however, a narrative framework can have more or fewer phrase variations. For example, a narrative framework can be associated with one or more phrases, where each phrase can be selected from one or more phrase variations. Further, phrases and/or phrase variations can be, for example, words, phrases, sentences, paragraphs, text elements, etc. portions or, combinations thereof.

While certain illustrative embodiments have been described, it is evident that many alternatives, modifications, permutations and variations will become apparent to those skilled in the art in light of the foregoing description.

What is claimed is:

1. A method for generating narrative content for a potential real-world event via a computer-implemented graphical user interface and narrative content generation system, the method comprising:
   receiving, from an integrated development environment (IDE) system using phrase variations from a narrative framework database storing sets of phrase variations, a generated narrative framework;
   generating a display on a display unit of a computing device, the display for representing the received narrative framework and comprising first and second phrase variations received from the IDE system and the narrative framework database;
   determining that the first phrase variation fails to satisfy a criterion relative to the second phrase variation and generating an error indication for the display;
   presenting a third phrase variation on the display, the third phrase variation received from the IDE system;

receiving an input from a user, indicating that the third phrase variation is to be used instead of the second phrase variation for the generation of the narrative framework;

generating for display on the display unit, a representation of the narrative framework received from the IDE system, the narrative framework comprising the first phrase variation and the third phrase variation and not the second phrase variation; and presenting, on the display unit, a narrative content preview generated from a content generation system used for applying real-world event information to narrative frameworks to generate narrative content and coupled to the IDE and the computing device, the narrative content preview comprising populating of the first phrase variation and the third phrase variation with sample information for the potential real-world event.

2. The method of claim 1, wherein the criterion is based at least in part on a context associated with a potential event.

3. The method of claim 1, wherein the criterion is based at least in part on a grammatical consistency between the first phrase variation and the second phrase variation.

4. The method of claim 1, further comprising:
presenting on the display unit a plurality of pre-stored sample information for the potential real-world event and a user selection interface; and
receiving from the user, via the user selection interface, a selection of sample information for populating the content preview.

5. The method of claim 4, wherein the user selection of sample information includes the sample information for populating the first phrase variation and second phrase variation.

6. The method of claim 1, wherein the narrative content preview received from the IDE system and the content generation system is based at least in part on a tone associated with the potential real-world event.

7. The method of claim 6, wherein the potential real-world event is selected from a following group: a business event, a current event, a historical event, a virtual event, a sports event, a player performance during an in-progress sporting event, a financial prediction, an internal reporting event.

8. A system comprising:
a processor; and
a memory having computing instruction stored therein, which, when executed by the processor, performs operations comprising:
receiving, from an integrated development environment (IDE) system using phrase variations from a narrative framework database storing sets of phrase variations, a generated narrative framework;
generating a display on a display unit of a computing device, the display for representing the received narrative framework and comprising first and second phrase variations received from the IDE system and the narrative framework database;
determining that the first phrase variation fails to satisfy a criterion relative to the second phrase variation and generating an error indication for the display;
presenting a third phrase variation on the display, the third variation received from the IDE system;
receiving an input from a user, indicating that the third phrase variation is to be used instead of the second phrase variation for the generation of the narrative framework;
generating for display on the display unit, a representation of the narrative framework received from the IDE system, the narrative framework comprising the first phrase variation and the third phrase variation and not the second phrase variation; and
presenting, on the display unit, a narrative content preview generated from a content generation system used for applying real-world event information to narrative frameworks to generate narrative content and coupled to the IDE and the computing device, the narrative content preview comprising populating of the first phrase variation and the third phrase variation with sample information for a potential real-world event.

9. The system of claim 8, wherein the criterion is based at least in part on a context associated with the potential event.

10. The system of claim 8, wherein the criterion is based at least in part on a grammatical consistency between the first phrase variation and the second phrase variation.

11. The system of claim 8, wherein the operations further comprise:
presenting on the display unit a plurality of pre-stored sample information for the potential real-world event and a user selection interface; and
receiving from the user, via the user selection interface, a selection of sample information for populating the content preview.

12. The system of claim 8, wherein the user selection of sample information includes the sample information for populating the first phrase variation and second phrase variation.

13. A method for generating narrative content for a potential real-world event via a computer-implemented graphical user interface and narrative content generation system, the method comprising:
receiving, from an integrated development environment (IDE) system using phrase variations from a narrative framework database storing sets of phrase variations, a generated narrative framework;
generating a first display on a display unit of a computing device, the display for representing the received narrative framework and comprising:
a data variable display region; and
a content preview region;
presenting, in the data variable display region, a label for a data variable and a set of phrase variations associated with the data variable from the narrative framework database storing sets of phrase variations;
presenting, in the content preview region, a narrative content preview generated from a content generation system coupled to the narrative framework database and the IDE, the narrative content preview having real-world event information applied to the represented narrative framework;
generating a second display for the display unit, the second display for comparing data variable values and comprising:
a data variable selection region;
a data comparator region;
a first comparison result region;
a second comparison result region; and
a content preview region;
receiving, via the data variable selection region, a first user selection of one or more data variables;
receiving, via the data comparator region, a second user selection of a comparison operation for comparing values of the one or more selected data variables;
receiving, via the first comparison result region, a third user selection of a first comparison phrase variation;

associating, in the narrative framework, the first comparison phrase variation to a first outcome for an application of the comparison operation to the one or more data variables;

receiving, via the second comparison result region, a second comparison phrase variation;

associating, in the narrative framework, the second comparison phrase variation to a second outcome for the application of the comparison operation to the one or more variables; and presenting, in the content preview region, a preview from the content generation system, the preview having real-world event information applied to the represented narrative framework, and including either the first comparison phrase variation or the second comparison phrase variation.

14. The method of claim 13, further comprising:

presenting a create variable display region in the first display;

receiving a user indication, through the create variable display region, that a new label is to be created;

receiving a fourth user selection of one or more phrase variations from the set of phrase variations;

associating the new label with the selected phrase variations.

15. The method of claim 13, further comprising:

receiving a fourth user selection of the one or more data variables via a second data variable selection region of the second display;

comparing a value of a first data variable and a value of the second data variable using the received comparison operation; and associating the received comparison phrase variations in the narrative framework with outcomes from the compared variable values.

16. The method of claim 13, further comprising:

highlighting a region within the content preview region of the second display, the highlighted region including the first comparison phrase variation corresponding to the outcome of the application of the comparison operation to the one or more variables.

17. The method of claim 13 wherein the comparison operation is a threshold operation.

18. The method of claim 13, further comprising:

presenting a second preview from the content generation system in a second content preview region of the second display;

wherein the first preview includes the first comparison phrase variation and an indicator for the first outcome, and the second preview includes the second comparison phrase and an indicator for the second outcome.

19. The method of claim 13, wherein the content preview received is based at least in part on a tone associated with the real-world event.

20. The method of claim 13, further comprising:

receiving statistics from a statistics provider system coupled to the content generation system through a communications network;

wherein the presented preview with real world event information includes the received statistics.

* * * * *